(12) United States Patent
Schmidt et al.

(10) Patent No.: US 7,337,440 B1
(45) Date of Patent: Feb. 26, 2008

(54) METHODOLOGY FOR GENERATING ACCESSING FUNCTIONS FOR PROGRAMMED EXECUTION OF PANEL-DRIVEN BUSINESS APPLICATIONS

(75) Inventors: Andrea Schmidt, Stuttgart (DE); Ute Twisselmann, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 09/624,524

(22) Filed: Jul. 24, 2000

Related U.S. Application Data

(63) Continuation of application No. 08/765,745, filed on Jan. 7, 1997.

(51) Int. Cl.
*G06F 9/44* (2006.01)

(52) U.S. Cl. ............... 717/169; 717/106; 717/121; 715/764; 715/825; 719/316

(58) Field of Classification Search ........ 717/106–109, 717/120–122, 168–178; 709/106, 201, 310; 345/440, 762–764, 866; 715/764, 825; 719/313–317
See application file for complete search history.

(56) References Cited

U.S. PATENT DOCUMENTS

| | | | | |
|---|---|---|---|---|
| 5,428,782 A | * | 6/1995 | White | 709/101 |
| 5,586,312 A | * | 12/1996 | Johnson et al. | 707/10 |
| 5,764,897 A | * | 6/1998 | Khalidi | 709/201 |
| 5,806,062 A | * | 9/1998 | Chen et al. | 707/4 |
| 6,289,393 B1 | * | 9/2001 | Phillips et al. | 709/315 |

* cited by examiner

*Primary Examiner*—Kakali Chaki
*Assistant Examiner*—Lawrence J Shrader
(74) *Attorney, Agent, or Firm*—Floyd A. Gonzalez; Arthur Ortega

(57) ABSTRACT

A method of providing access to Business Applications (BA) offering their services and interactively controlled by a multitude of BA panels, the BAs displaying succeeding BA panels dependent on user interactions, user specified data and the contents of any kind of data base the BA is operating on. The individual panels, the sequence of the panels as they are displayed by the BA and the activities required to launch a BA to display a succeeding panel results in a User Interaction Graph (UIB) modeling the spectrum of panel interactions with a BA. Analyzing the UIB generates Transaction Methods (TM) for autonomously executing and controlling a sequence of BA panels which, with the correct input information Passed over the TMs, initiate the required activities for traversing through a certain panel sequence and returning the output information gathered during its execution.

30 Claims, 11 Drawing Sheets

Figure 1:
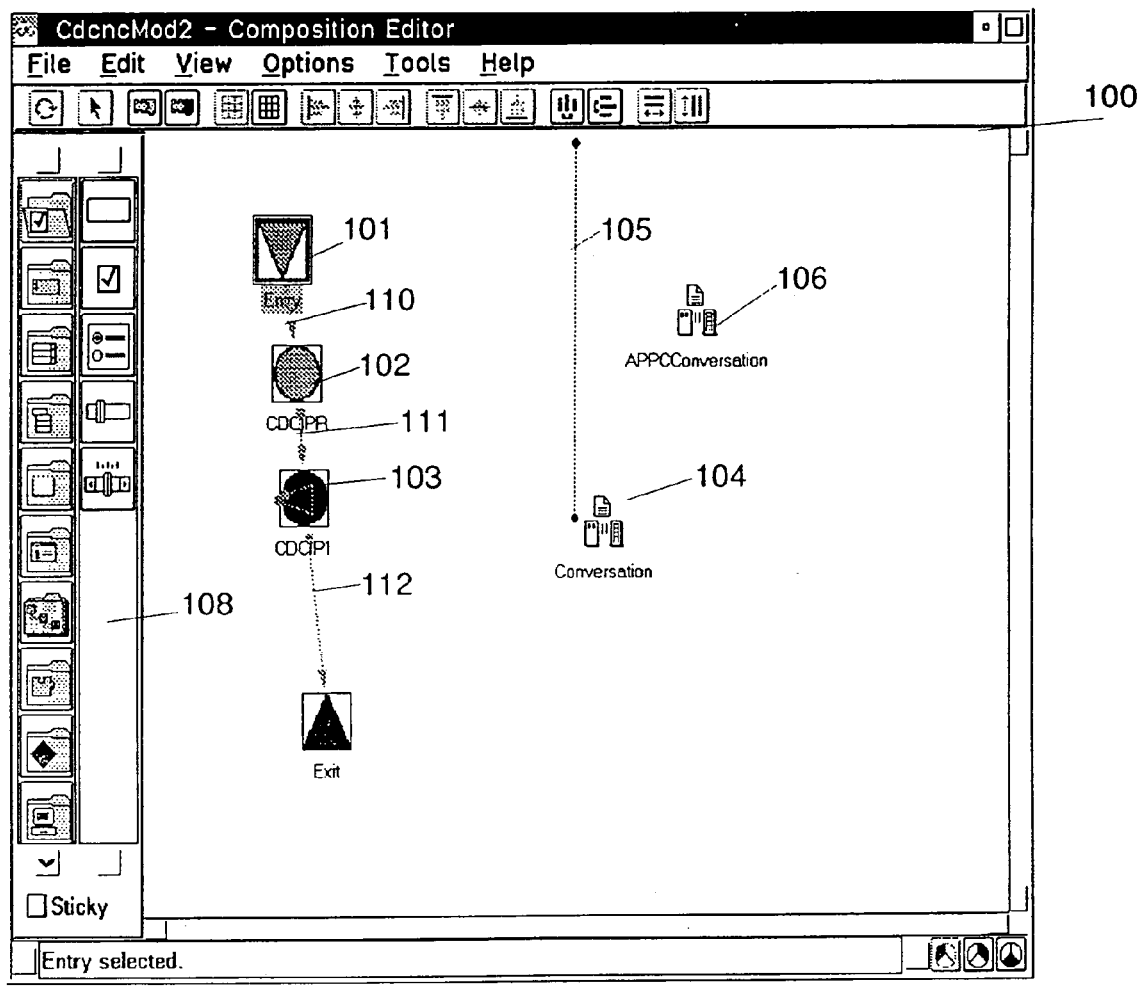

METHODOLOGY FOR GENERATING ACCESSING FUNCTIONS FOR PROGRAMMED EXECUTION OF PANEL-DRIVEN BUSINESS APPLICATIONS

CROSS-REFERENCE TO RELATED APPLICATIONS

This is a continuation of application Ser. No. 08/765,745 filed Jan. 7, 1997.

1 BACKGROUND OF THE INVENTION 1.1 Field of the Invention

The present invention relates to a method allowing and guiding the integration and migration of Business Applications (BA) executed on a data processing system into modern environments. In particular the present invention relates to a method of providing access to BAs executed on a data processing system wherein said BAs hitherto offer their services interactively controlled by a multitude of BA panels and wherein said BAs may display succeeding BA panels dependent on user interactions, user specified data and the contents of any kind of data base the BA is operating on.

1.2 Description and Disadvantages of Prior Art

Exploiters of information technology as well as information technology itself are confronted with a new dimension of flexibility and adaptability challenges for software supporting and controlling their business. Of course the software development techniques are confronted with these requirements too. On one hand business initiatives are the creators of these demands on the other hand information technologies themselves are the driving forces.

Companies are coping with new and changing market requirements. Improved customer services and time-to-market are key differentiators. Globalization of markets, organizational changes like decentralization, new cooperations require new business structures and concepts. As an answer to these challenges companies are attempting to re-engineer the underlying business processes to a serious extend. Business application software encompassing a huge spectrum of different application types, like Online Transaction Processing Applications (OLTP), data base applications etc., has an important supporting and enabling element in this arena it has to follow these tracks. The situation is even worse as information technologies themselves undergo drastic changes by offering new technologies like Client/Server, multi-media and object-oriented (OO) technologies.

Various approaches are known as attempt to integrate, to migrate or to adapt existing BAs to these changes in general and to OOT in specific, as OOT becomes more and more important and is believed to be the unifying approach for accessing other types of new technology.

If the origins of a given application are dated back many years and sometimes even more than a decade and if technologies have been subject of dramatic evolution, a first impulse might suggest to abandon these types of legacy applications, as an adaptation with respect to the new technologies like client/server concepts etc., these applications haven't been prepared for, seems hopeless.

No doubt that this kind of approach might be reasonable in certain situations. The decision to "throw away" a legacy application often is a hasty response. Searching for alternatives allowing to "reuse" the legacy applications is worthwhile as they contain valuable knowledge on the business they are supporting. Many person-years would have to be spent for their re-implementation. Also as many companies rely in a vivid sense on their business supporting applications such discontinuities may not be acceptable and more evolutionary approaches may be favorable instead.

Modernization of legacy applications by restructuring could be an alternative attitude. As a result this concept often requires great investment in the old application itself whereas the "visible" effects of modern technologies are very modest compared to the overall effort. Sometimes restructuring an application actually led to a completely new implementation. If on the other hand this "hidden" re-implementation is to be avoided typically one is limited with respect to the freedom of designing the characteristics of the new application structure.

Another approach in this arena, called "face-lifting", concentrates on the user interfaces of existing BA exclusively. This type of approach is limited to just renovate the panel driven user interfaces attempting to realize user interfaces showing more proximity with modern graphical user interfaces available on personal workstations. An important flaw of this type of approach is its inability to modify the execution sequence inherent in the existing panel flow.

1.3 Objective of the Invention

The invention is based on the objective to generate and execute access structures for executing BAs, which offer their services interactively controlled by a multitude of BA panels, avoiding the handling of the multitude of individual panels explicitly by a user. The same method should hold also for the case that the BAs are executed on a remote data processing system, i.e. not on the same system requesting the services of the BAs.

2 SUMMARY AND ADVANTAGES OF THE INVENTION

The objective of the invention offers the benefit to automatically generate the Transaction Method (TM) procedures for accessing and programmed execution of a Business Application (BA). The BA hitherto offers its services by a sequence of panels and might have never been prepared for a programmed execution. The TM generation process is based on a description of the panels currently used and processed by the BA to interact with its exploiter. A generated TM performs, just by being called, the execution of at least a part of a BA. A TM then operates autonomously and executes and controls the BA, handling, invisible to its caller, the panels processed by the BA. The TM automatically enters all required input parameters into the correct positions of the BA panels and returns the output information delivered by BA panels to its callers. A BA which may have never been prepared for programmed execution now can be processed by calling a TM and thus offers its services to other programs. It might be even possible that the same application may be exploited by certain users via the traditional panel driven user interfaces.

Additional advantages of the invention prepares the basis for automatic TM generation by proposing a method of setting up said BA panel description being the input to the TM generation process. Having available a detailed description of each BA panel, also called a BA message, in form of a Transaction Record (TR) and the sequence of BA messages as processed by the BA in form of User Interaction Graph (UIG) allows to generate TMs, which, when executed, are able to handle the BA messages in an adequate sequence.

Additional advantages of the invention enable the generated TMs not only to fill data into or extract data from BA messages but also to select a particular action to launch the BA to process a particular next BA message sent as a response.

Additional advantages of the invention provide that the TMs can be generated such that they have a precise knowledge on all aspects, like type, length, position, input/output character and so forth, of each individual BA message element and parameter. This knowledge is fundamental to the TM capability of autonomously executing and controlling the BA.

Additional advantages of the invention provide that exploiters of the invention are offered the freedom of choice to either gather the information for the BA message description interactively or to extract the information by parsing the BA message implementations available from the BA execution environment. The parsing approach significantly eases and speeds up the process of modelling and defining the BA message descriptions.

Additional advantages of the invention provide that the automatic TM generation process is equipped with information allowing to determine which BA messages sequences are grouped together to be handled by TMs. The various indication of TRs can be used to define the begin or end of an individual TM.

Additional advantages of the invention provide decision rules to the automatic TM generation process for decomposing the whole UIG into individual BA message execution units and to create separate TMs for each execution unit.

Additional advantages of the invention provide decision rules to the automatic TM generation process for determining the input and output parameters of the TMs to be generated.

Additional advantages of the invention provide for the execution of the generated TMs and the BA, which is controlled by the TMs, on remote data processing systems. Thus the teaching of the current invention allows the setting up of modern Client/Server structures even if the actual BA has never been designed or prepared for this types of architectures.

Additional advantages of the invention provides for an integration of existing BAs into modern object-oriented (OO) environments becomes possible. The TMs may be generated as methods of object classes, called Transaction Object (TO) classes, which encapsulate the existing BAs.

Additional advantages of the invention provide that the integration of the BA into OO environment becomes seamless as also the TRs are generated as object structures. Furthermore being objects the TRs can now be enhanced by incorporating not only BA message descriptions but also by offering certain processing capabilities leading to clear overall architectures.

A further objective of the invention provide for the detailed execution of TMs and their interplay with the BAs. Many of the benefits of this method have been discussed above.

3 BRIEF DESCRIPTION OF THE DRAWINGS

FIG. 1 is a diagram reflecting the definition process of a Transaction Object Class and its associated Transaction Records building the User Interaction Graph.

Figure 2:
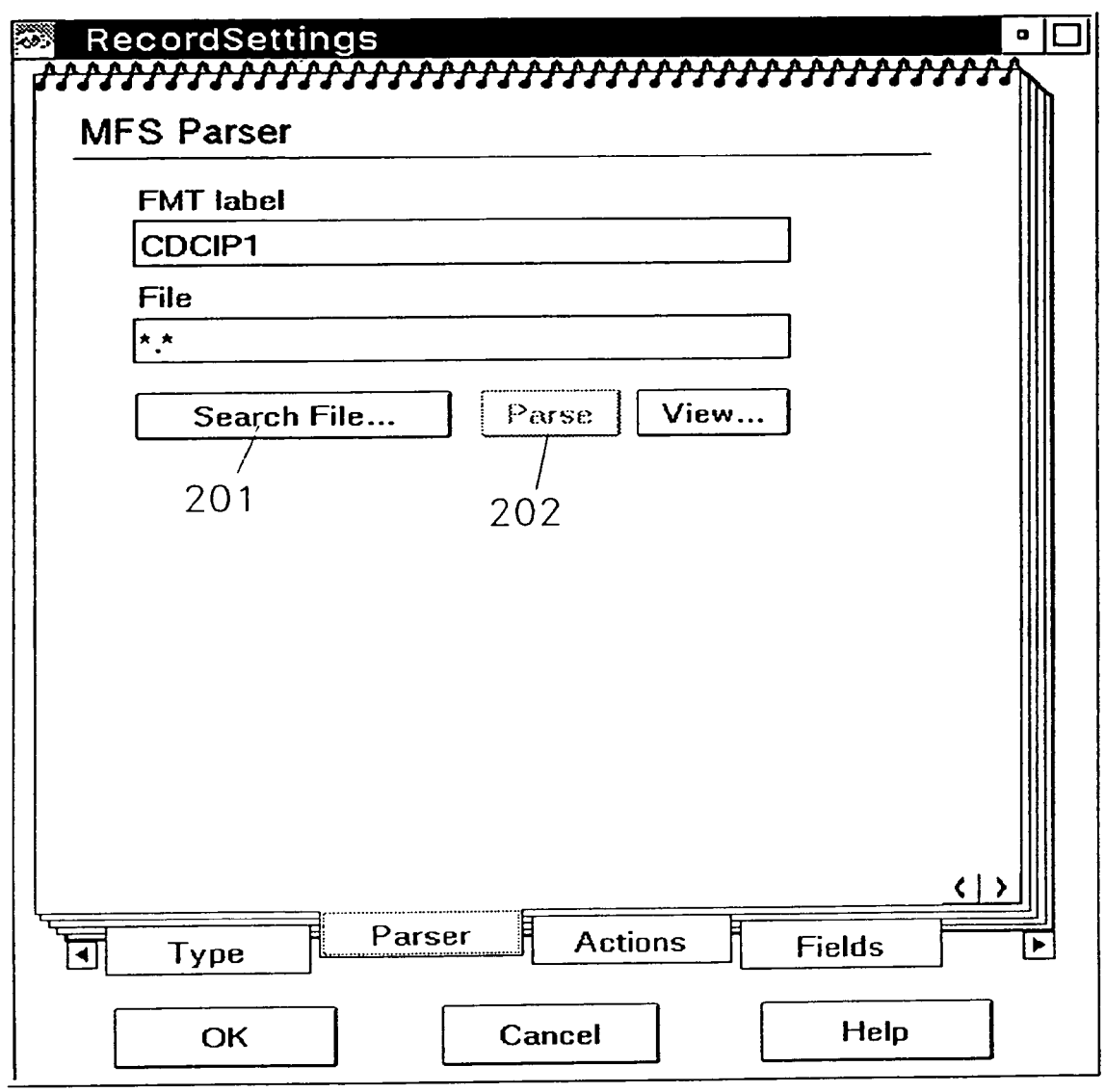
Figure 3:
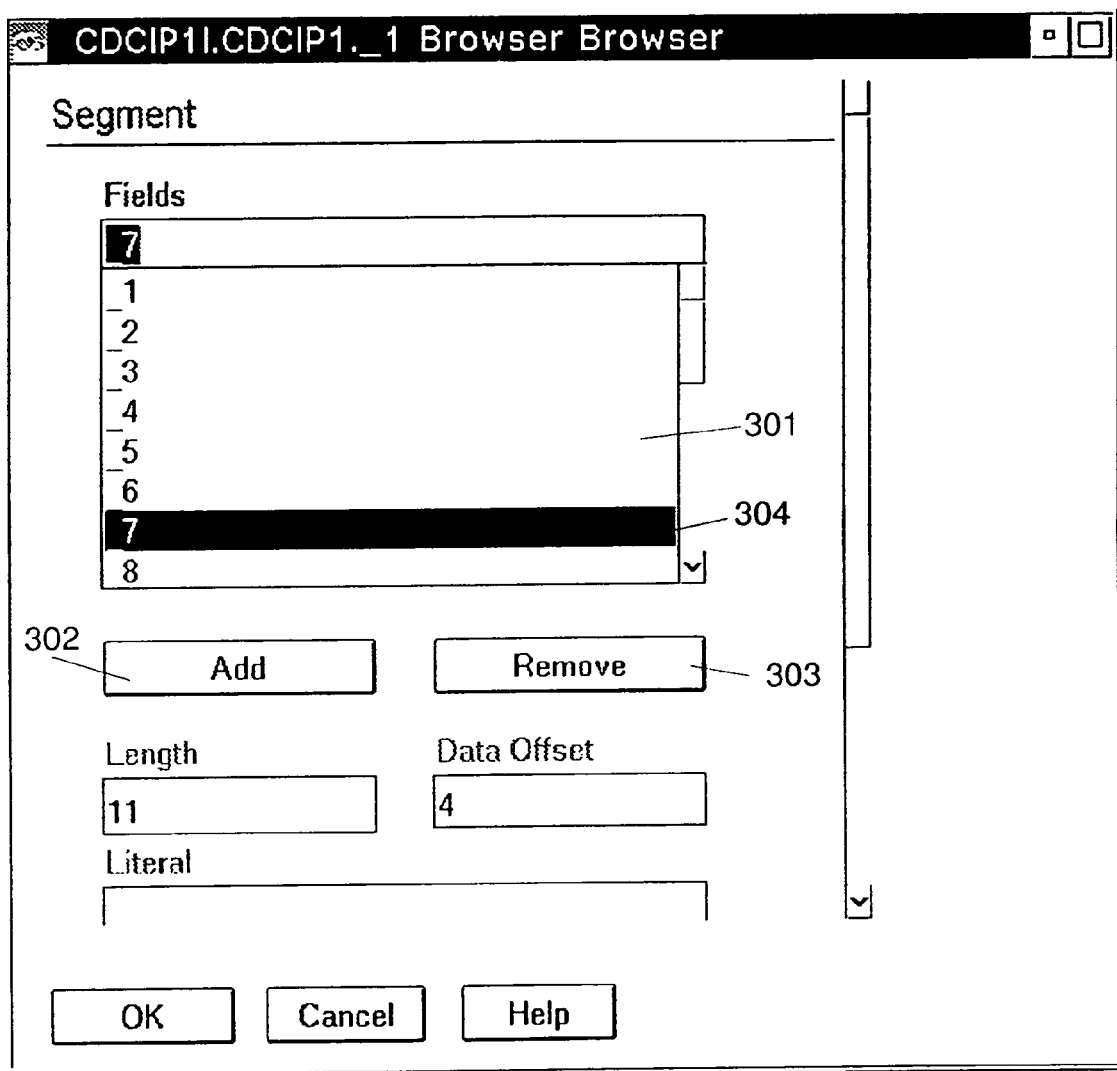
Figure 4:
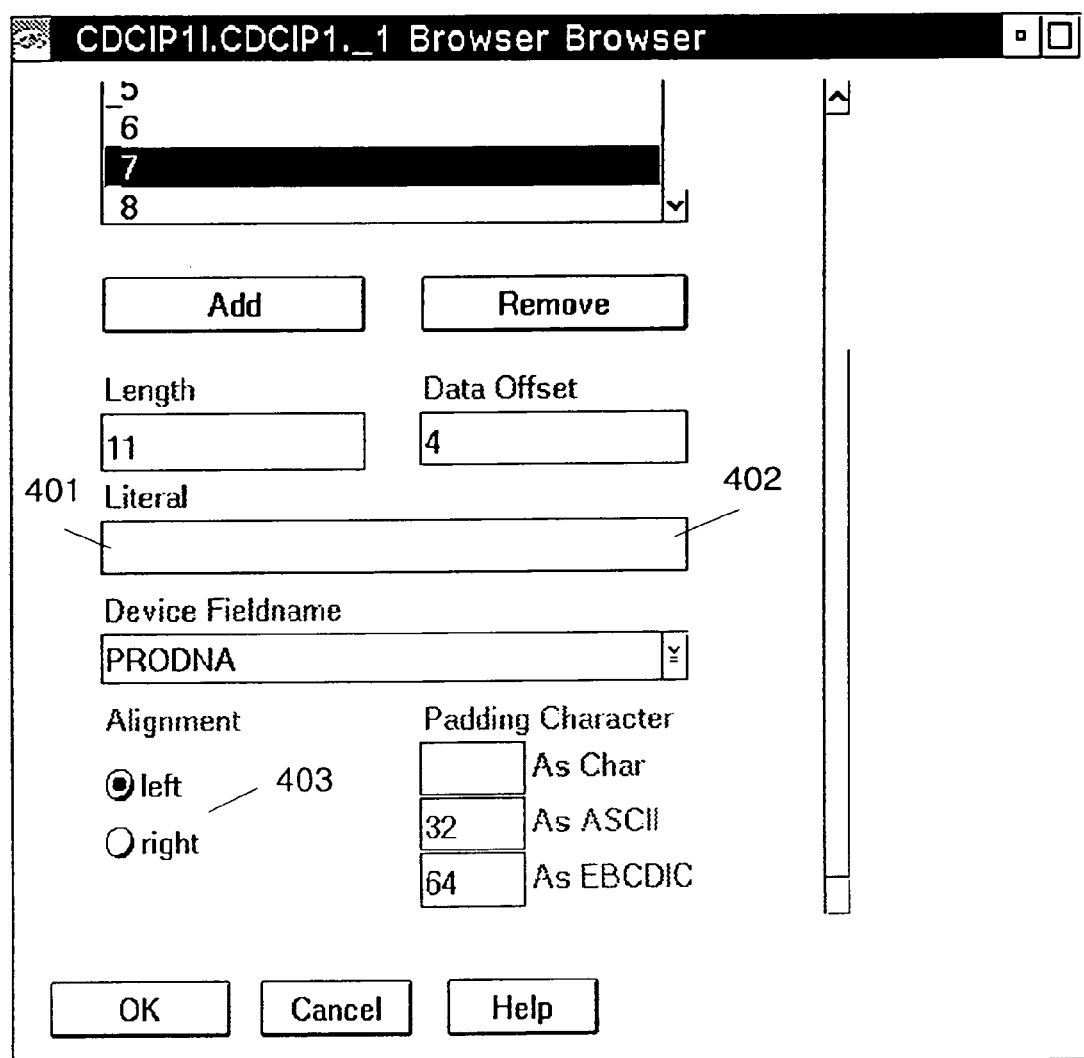
Figure 5:
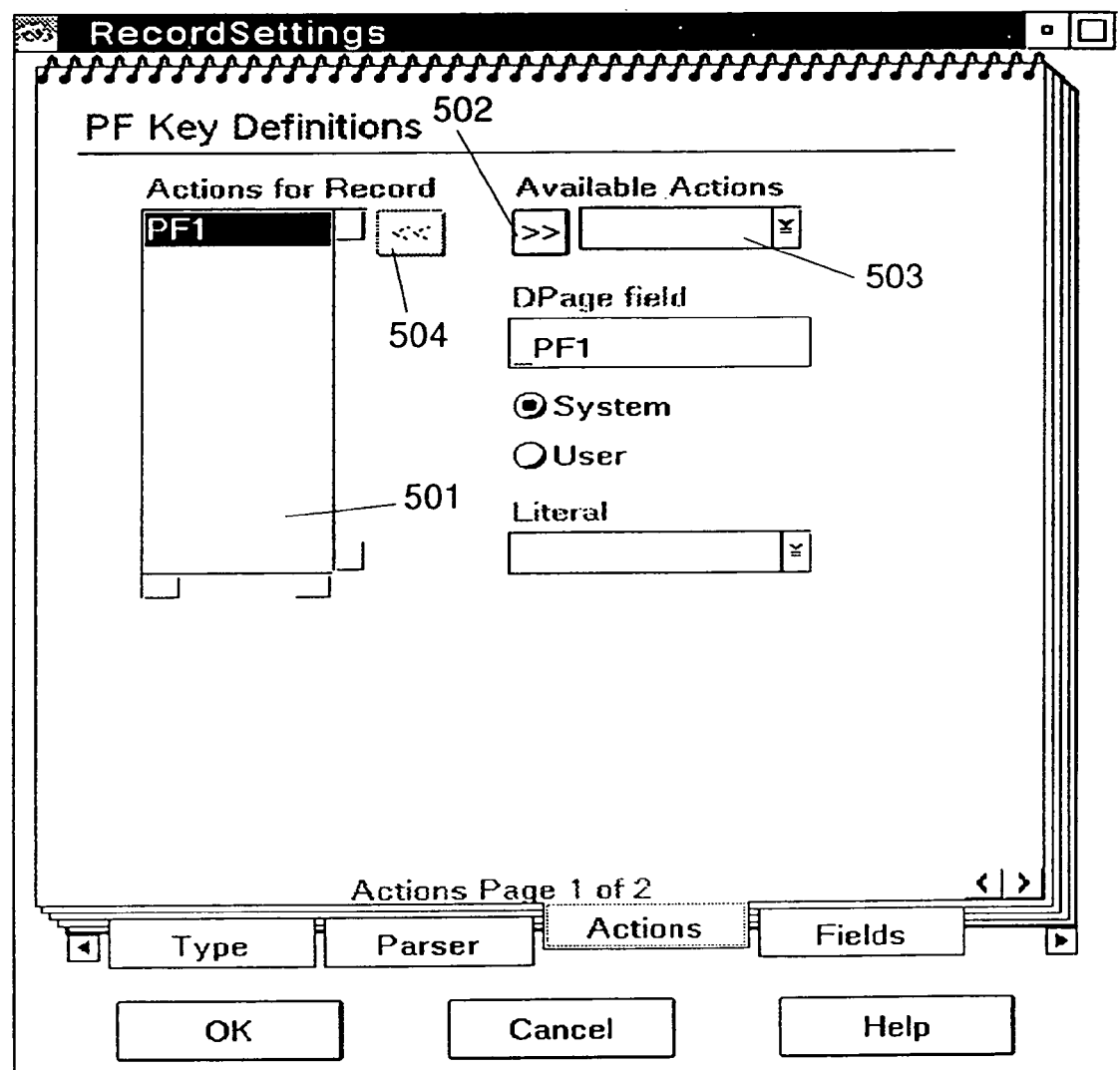
Figure 6:
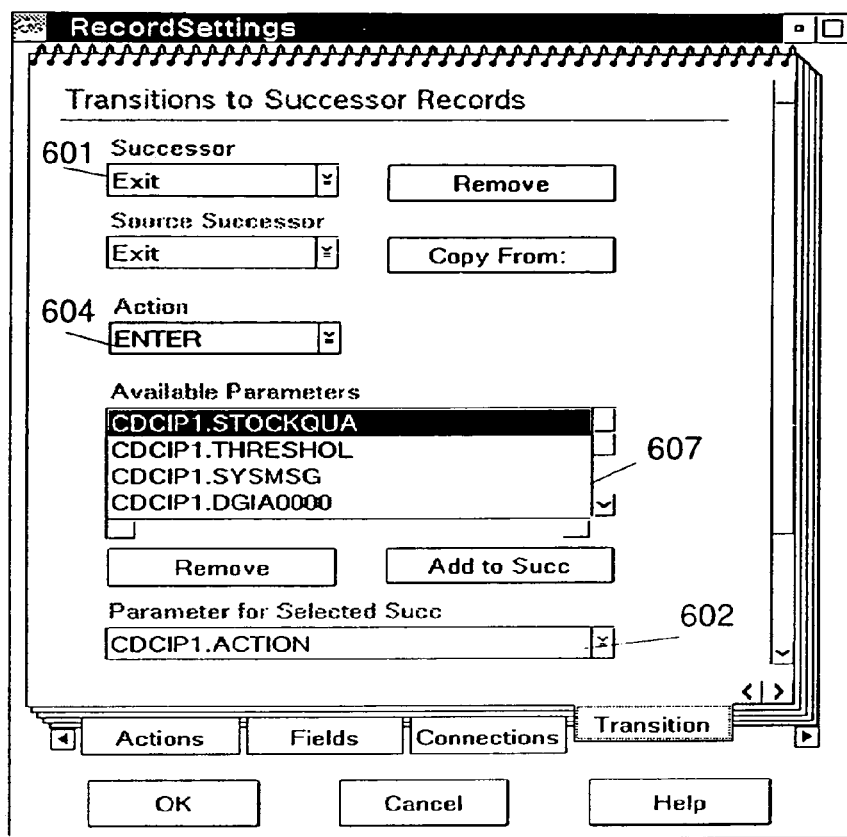
Figure 6:
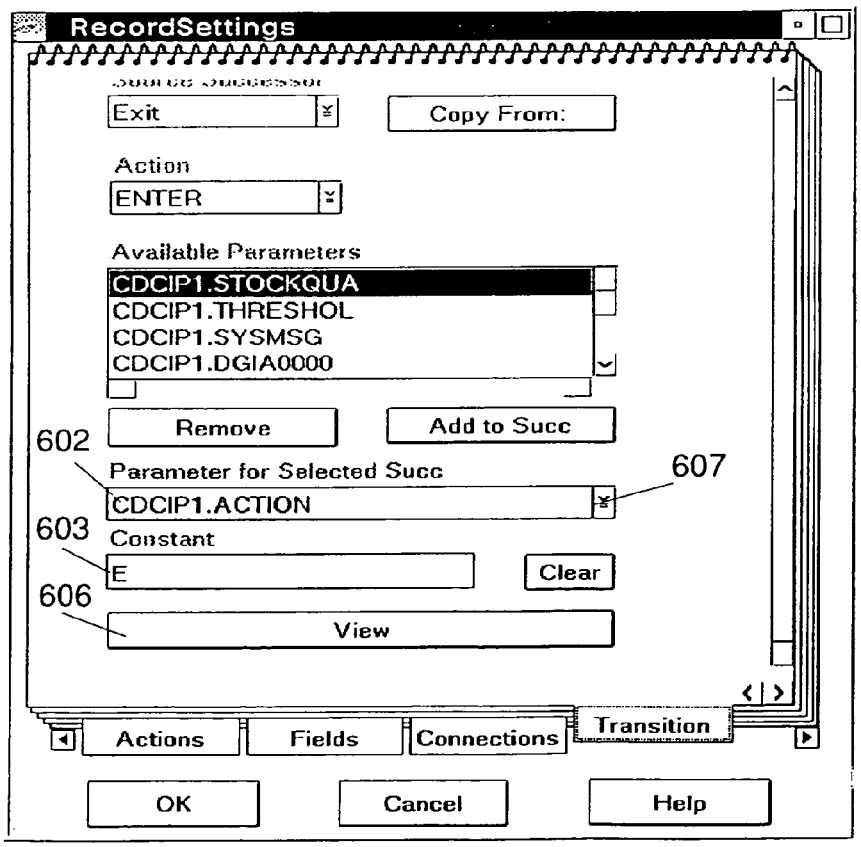
Figure 7:
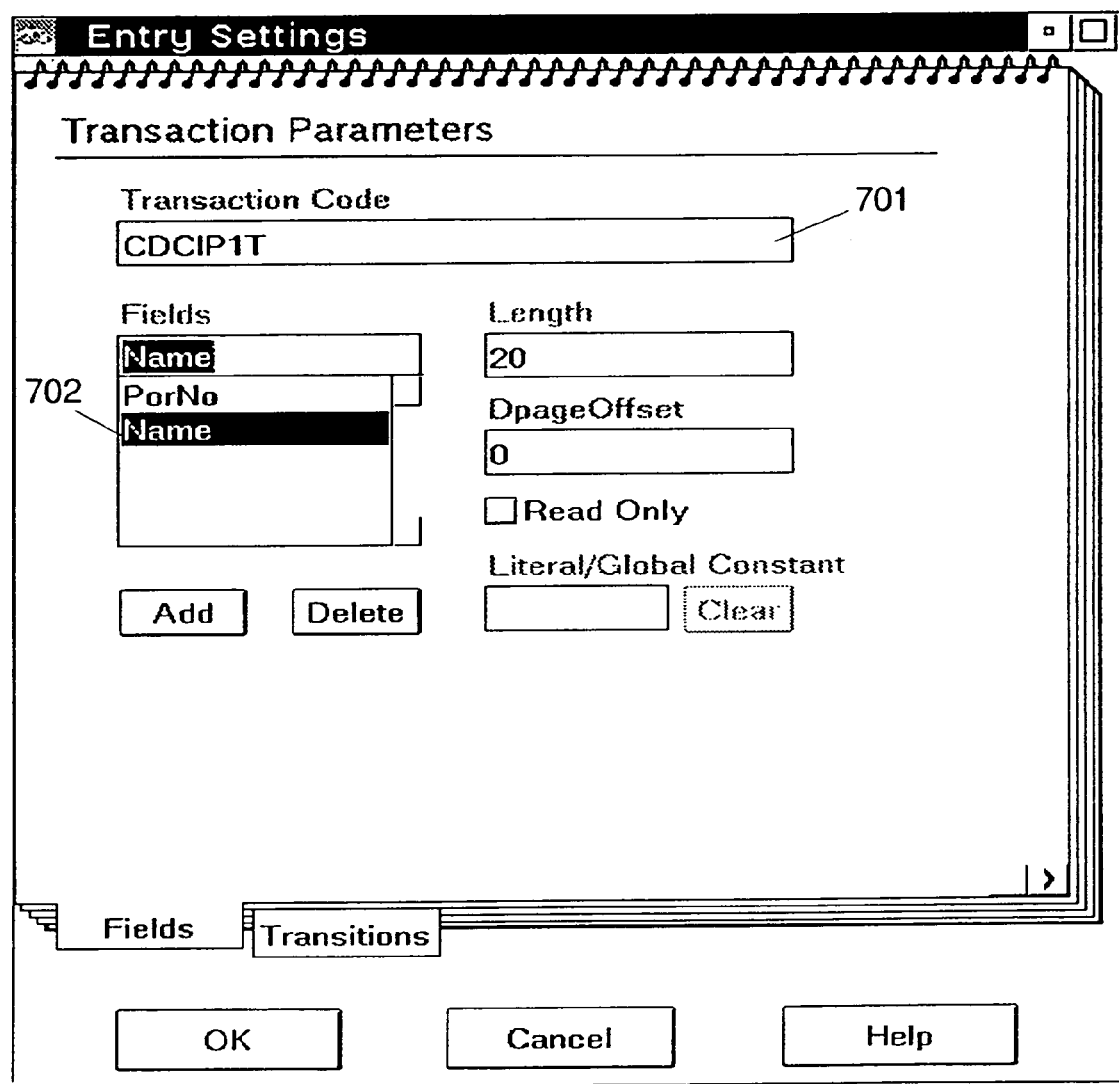
Figure 8:
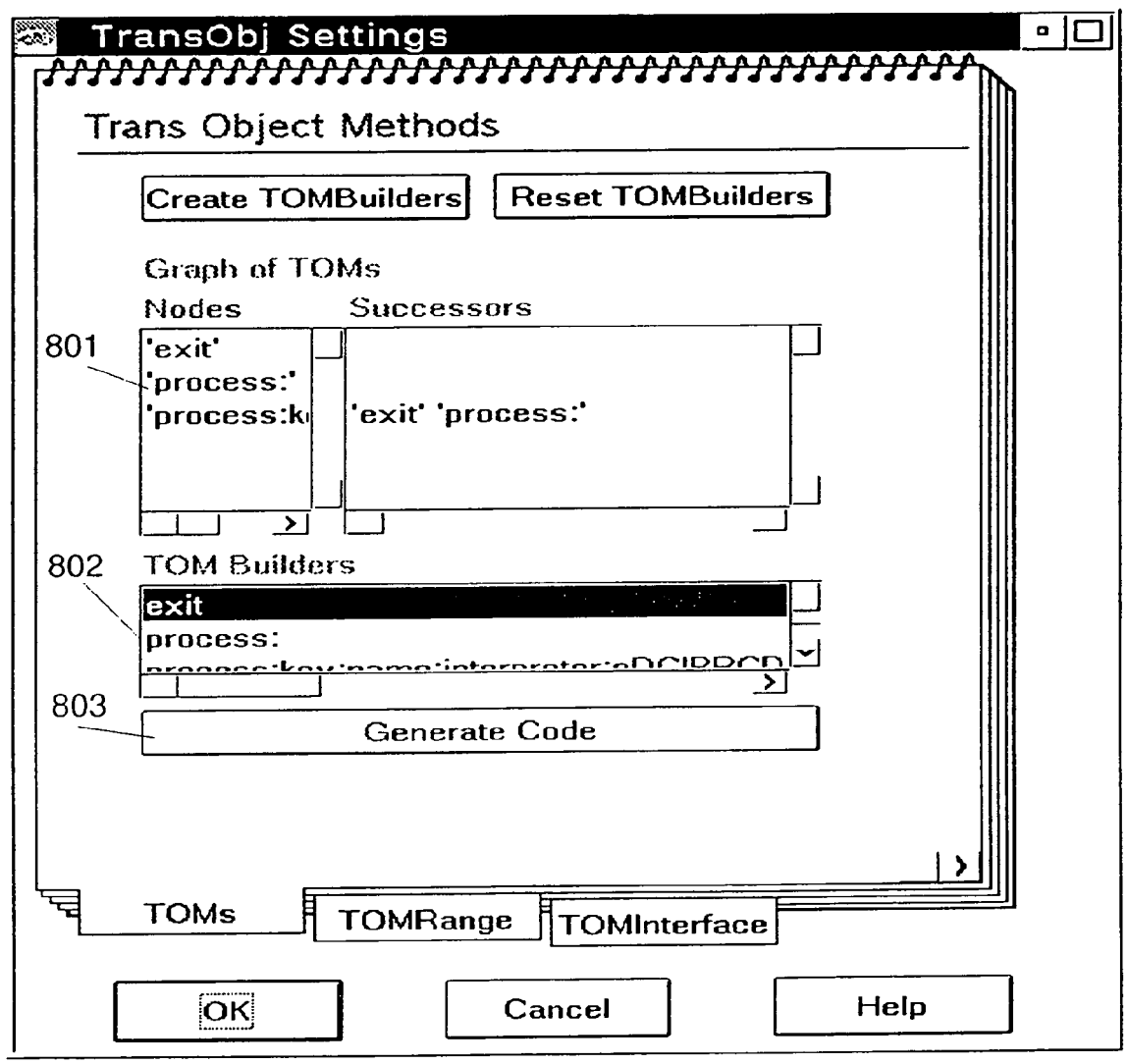
Figure 9:
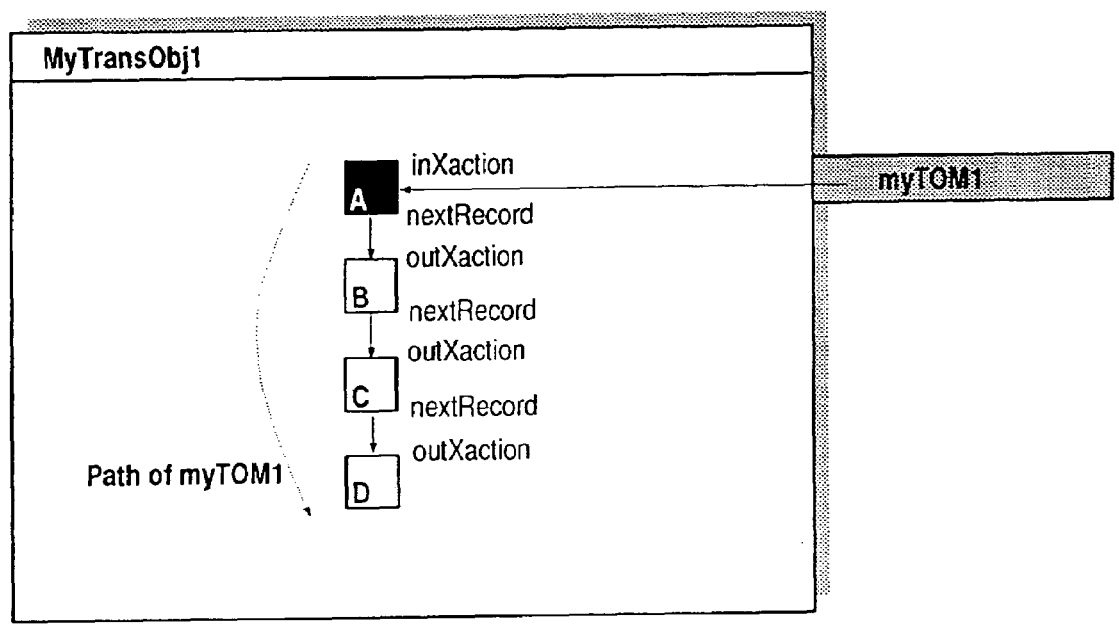
Figure 9:
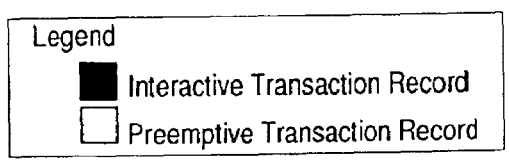
Figure 10:
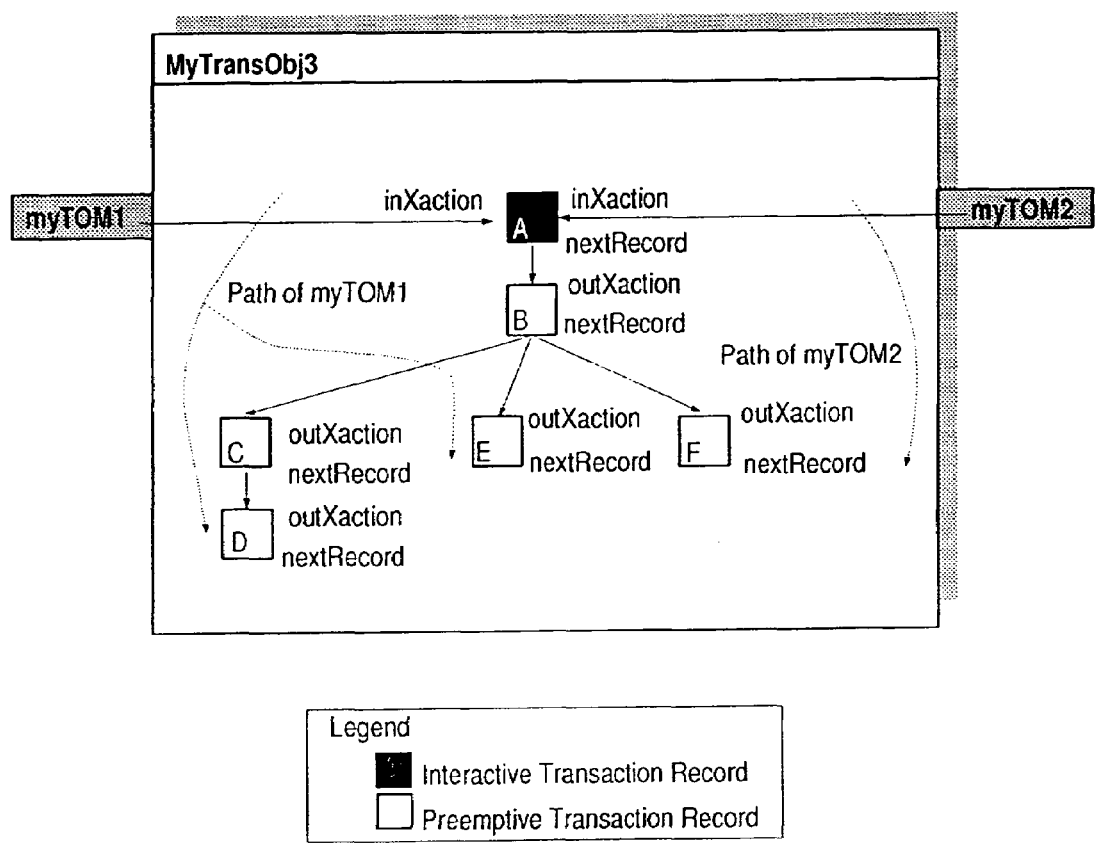
Figure 11:
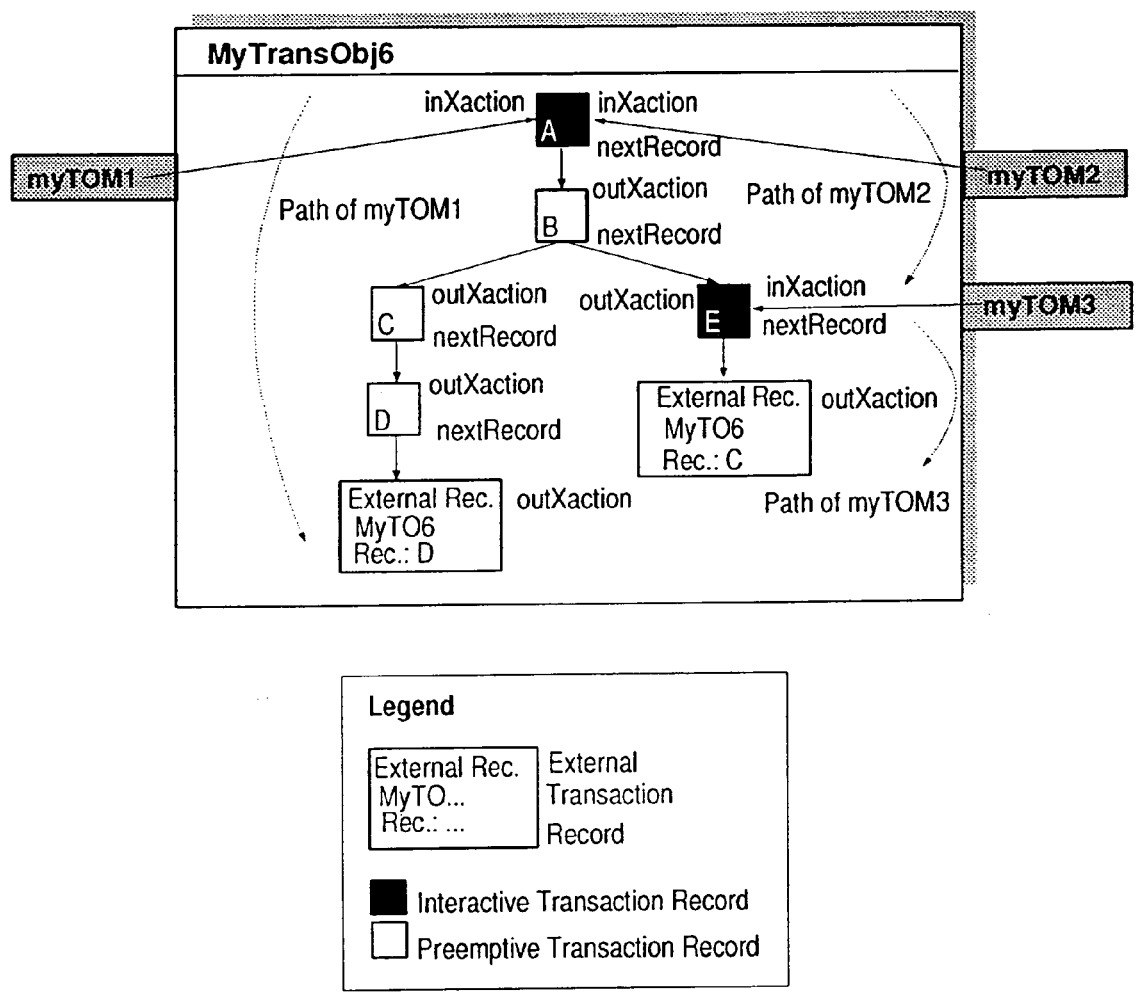

FIG. 2 is a diagram showing the parsing capability for analyzing IMS message definitions FIG. 3 is a diagram visualizing the overview of the individual data fields modelled in a Transaction Record together with the description of an individual data field within a Transaction Record FIG. 4 is a diagram visualizing the overview of the individual data fields modelled in a Transaction Record together with the description of an individual data field within a Transaction Record FIG. 5 is a diagram reflecting the process of modelling the activities for launching a transaction to process a next Transaction Record FIG. 6 is a diagram showing how to model the details of a transition of a first Transaction Record to a second Transaction Record FIG. 7 visualizes modelling details of an Entry Transition Record FIG. 8 offers an overview of a User Interaction Graph decomposition into TOMBuilders FIG. 9 is a diagram showing a first example of a User Interaction Graph and its decomposition into Transaction Object Methods FIG. 10 is a diagram showing a second example of a User Interaction Graph and its decomposition into Transaction Object Methods FIG. 11 is a diagram showing a third example of a User Interaction Graph and its decomposition into Transaction Object Methods

4 DESCRIPTION OF THE PREFERRED EMBODIMENT

The present invention is part of a larger environment, called VisualBridge, allowing and guiding the integration and migration of Business Applications (BA) executed on a data processing system into modern environments. In particular the present invention relates to a method of providing access to BAs executed on a data processing system wherein said BAs hitherto offer their services interactively controlled by a multitude of BA panels and wherein said BAs may display succeeding BA panels dependent on user interactions, user specified data and the contents of any kind of data base the BA is operating on.

The illustrating embodiment of the invention is based upon BAs running under control of a Transaction Management System, in the current case the well-known IMS (Information Management System) of IBM corporation. BAs in terms of the invention are represented as real transactions in this environment. Another possibility could be BAs running under the also well-known CICS (Customer Information Control System) of IBM corporation.

Even if the current invention deals with BAs processed under IMS the invention by no means is limited to this type of BAs. Actually any type of BA not just transactions in the sense of a transaction monitor are candidates for the current invention. The invention has been successfully implemented and verified within the Smalltalk based VisualAge product of IBM.

The goal of VisualBridge is the definition of object structures in the sense of object-oriented technology (OOT) encapsulating and wrapping existing BAs. The BAs themselves are wrapped into so-called Transaction Objects (TO) being enabled to autonomously controlling and executing the encapsulated BAs. Business Objects (BOs) on the other hand, being introduced as object structures modelling a unique entity or concept in terms of the underlying business, may exploit the TOs by transparently signalling the TOs to execute the encapsulated BAs. The subject of the current invention extends the TOs by modelling, generating and executing OO methods, called Transaction Methods (TM) or with an OO environment, Transaction Object Methods (TOM), representing execution units of the underlying BAs.

Each TOM is enabled to transparently and autonomously executing and controlling the BAs by handling a sequence of BA panels. Of course the original BA panels are not displayed by the TOMs though the BA is processing panel by panel not being aware of the fact that the panels are going to be intercepted and processed by the corresponding TOM.

In the following we will adapt, with respect to the term "object", to the language of OOT and, if unmisleadingly clear by the context, will refer to a class and the instance of a class in an unifying manner as object.

Further aspects of VisualBridge are:

Modification of the underlying legacy application (IMS transactions in this case) should be limited to a minimum thus allowing a maximum of reuse of prior application development efforts.

Actually no modification of the legacy application is required at all.

This migration architecture and environment therefore can be viewed as a mediator between the legacy code and the new object structure.

The new object structure on the other hand is the ideal basis for new types of graphical user interfaces (GUIs)

as integration platform with additional applications

IMS offers IBM's Advanced-Program-to-Program-Communication (APPC) protocol suite, a concrete protocol for communication purposes between programs across computer system boundaries. In addition APPC is available in IMS as a so-called "implicit-APPC" support allowing especially IMS transactions, which originally have been developed for a 3270-type of terminal only, to be scheduled for execution transparently to the transaction from remote via APPC and to exchange data simulating a 3270-type terminal interaction based on the APPC protocol suite. The embodiment of the invention is based on the exploitation of that implicit APPC support.

The transactions developed for a 3270-type terminal may also be controlled by handling and emulating the 3270 data stream directly. This would be a simple alternative to the implicit APPC approach above.

BOs in the sense of the migration architecture are carriers of persistent data re-instantiated according user needs. Interaction with the BOs via the BO methods transparently will retrieve or modify BO data based on the existing interfaces of the remote transactions.

An analysis of existing transaction applications will reveal that typically input/output data of a transaction is related not only to a single BO. Execution of a transaction thus could result in the transparent reference/instantiation of a multitude of BOs.

a single transaction is related to a true subset of BO attributes only. This leads to the interesting effect that instantiation of the BOs may occur partially only, i.e. only with respect to a subset of BO attributes. BOs are made available only to the extend actually necessary. As desired the number of available BO attributes increases dynamically resulting in very effective and economic handling of storage resources.

The migration architecture itself is to be implemented with OO-techniques.

Individual parts of the overall concepts are discussed as architectural elements below. By no means are the following concepts limited to OO environments; they may be exploited for conventional, i.e. functional programming approaches as well.

4.1 The Overall Architecture

Of course the overall architecture itself is realized with a set of classes in the sense of an object-oriented programming language (in this case Smalltalk) offering a framework of classes with carefully adapted functionality.

Migration of an existing Online Transaction Processing Applications (OLTP) application to this proposed architecture means to implement a set of application specific classes by the process of sub-classing from the fundamental architecture base classes. At run-time instances of these application specific object classes will then support transparent execution of the existing OLTP transactions partially using BO attributes as OLTP data elements. The application specific classes implement that part of the overall functionality which is not generically available within the architectural base classes. This OO-type approach reduces the application-specific development effort significantly and at the same time increases the implementation flexibility.

Thus the client system offers a set of persistent BOs. Interactions with the BOs may transparently result in the execution of OLTP transactions completely hiding the underlying transaction system, the specific structure of transactions, the data bases manipulated by the transactions and of course the communication details of the client and the serving computer system running the OLTP application.

The major architectural elements to be discussed individually are:

1. Business Objects (BOs)

2. BO Instance Space (BOIS)

3. Transaction Records (TRs)

4. Transaction Objects (TOs)

4.1.1 Architectural Element: Business Objects (BOs) (Part 1)

BOs are key elements of the overall architecture as other architectural elements are accessible in an indirect manner only by interacting with the BOs the set of BO classes and BO instances form a layer shielding a BO exploiter from the rest of the migrated OLTP application and from the legacy application itself.

As indicated already by the name, BOs are the objects which in a straightforward sense are those entities the business domain is dealing with. With respect to nature and granularity the BOs are representing the model of the enterprise domain. Obvious BO examples are customers, contracts, orders, accounts, etc. As BOs are carriers of persistent data to be retrieved and manipulated through the use of existing transactions, the BO's data spectrum is to be defined as the set of BO attributes. As an outstanding property the current approach of discovering and defining the BO attributes is characterized by the peculiarity that it is based upon the input and output data spectrum of the existing transaction application, or in other words, it is based upon the existing transaction's user interface (UI) specifications. To understand the background and advantage of this methodology, it has to be realized that the UI specifications directly reflect the business related data, i.e. the data elements a business user of the transaction applications is dealing with. According to the experience with this type of approach based on this business point of view the data elements essential to the business domain can be determined and related to the different types of BOs as BO attributes easily and very efficiently.

that the existing transactions will be used in a later step for retrieval and manipulation of the BO data. The data being part of the UI specification therefore exactly delimits the data spectrum available as BO attributes.

that this avoids to analyze complicate data base structures grown historically in an evolutionary process. In addition the data bases themselves do not contain the business relevant data directly because certain types of mappings often occur between the data bases and user interface reflected data.

The data accessible through the transactions typically resides in (sometimes a multitude of) data bases. The BO classes therefore model various types of persistent BOs. To be able to uniquely identify the various instances of a BO of a single class the set of BO attributes has to distinguish BO key attributes (BOKA)

Typically they are represented by (a very small) subset of the BO attributes which, with respect to the underlying data bases, uniquely identify together with the BO class a certain BO instance. Of course the BO key attributes directly result from the key attributes of the corresponding data bases.

BO general attributes (BOGA)

All the rest of the BO attributes, not allowing to uniquely distinguish the various BO instances within the data bases, are referred to as general attributes.

When relating the BO attributes with the UI specification of a multitude of existing transactions, following fundamental observations are of importance The input/output data elements in the UI specification of an existing transaction may refer to a subset of BO attributes. That is, with respect to a certain BO class only part of its attribute spectrum can be related to the input/output data elements of a single transaction. Conversely, there exist further BO attributes which do not occur within the input/output data elements of a certain transaction.

The input/output data elements in the UI specifications of an existing transaction may refer to subsets of attributes of different BOs.

Different attributes of a certain BO may refer to input/output data elements of different transactions.

4.1.2 Architectural Element: BO Instance Space (BOIS)

Each instantiated BO is stored together with the other BOs within a specific collection, called the BO Instance Space (BOIS). As every BO is uniquely identified by the class of the BO together with the specific values of the BO key attributes this set of information also is sufficient for unique identification of BO instances within the BOIS.

The necessity of introduction of the concept of a BOIS is a direct consequence of the observations discussed in the chapter "Architectural Element: Business Objects (BOs) (Part 1)": if a single transaction typically delivers only parts of the spectrum of the attribute values of a BO instance and if thus the execution of multiple transactions is required to stepwise complete the BO attribute values, it must be possible to search for the possible existence of a certain BO instance at a unique place to stepwise complete/update the attribute values of a certain BO instance and at the same time to make the updated BO instance available to all exploiters of the BO.

This partial BO instantiation extended by the process of stepwise completion of BO attributes is called materialization in the following to distinguish it from a complete instantiation. This concept of materialization offers some very attractive advantages:

It allows for the operation with incomplete data.

In contrast with other persistence models it offers very economical usage of storage. BO instances are not instantiated with respect to their whole attribute spectrum. This is of special importance as on the level of business relevance objects can become very large. BO instances are materialized only to the extend actually required by the exploiter.

During lifetime of a BO instance its attribute spectrum may be completed step-by-step.

Directly correlated with the BOIS is the question of the lifetime of a certain BO instance. As in the general case a multitude of transaction executions might be required for a BO materialization, a BO instance must have a lifetime larger than that of an underlying materializing transaction. In the current solution a BO instance "lives", if not deleted explicitly by an exploiter, as long as at least one exploiter is referring to that BO instance.

4.1.3 Architectural Element: Transaction Records (TRs) (Part 1)

When calling a certain transaction it expects in the general case a certain amount of data as an input data block. As a result of the execution an output data block is returned. With respect to IMS these data blocks are called input/output areas (IOAREAs). Each of the IOAREAs may represent a panel displayed by the transaction on some computer screen.

From their inherent meaning the input/output data blocks can be viewed as a message known to the transaction which are exchanged for transaction invocation and return.

The various types of messages are modelled as specific object classes called Transaction Records (TRs). The important point about TRs is that they represent not an unstructured stream of bytes. TRs are equipped with descriptive information defining for each data element, being part of the message, the exact location, its length, its type, . . .

defining for each data element the specific BO class the specific BO attribute it is representing defining the data elements not related to a certain BO class, but nevertheless represent input/output data of the transaction Thus the TR architectures the central link between the BO classes and corresponding BO attributes on one side and the individual input/output parameters of a transaction. TRs therefore store mapping information from a data element within an input/output message onto a data element within a BO class, a BO attribute, and vice versa.

As already discussed together with the architectural element of a BO, different parameters of a message, i.e. different parameters of a TR, may be related with BO attributes of different BO classes.

This mapping information is of fundamental importance to support BO materialization Using the mapping information it is possible to store each parameter of an output message of a transaction into the correct BO attribute thus guiding the materialization process.

to support the creation of an input message triggering the transaction execution Based on the mapping information it is possible to create
an input message processable by a certain transaction
and to fill it
with data resulting from well-defined BO attributes
with data from additional input parameters not related
to a certain BO class 4.1.4 Architectural Element: Transaction Objects (TOs) (Part 1)

Transaction Objects (TOs) are the classes to represent a model of at least one transaction. If a certain set of transactions is executed always in the same a predefined sequence, it may be reasonable to model such a group of transactions as a single TO.

Without restriction of generality let's assume for the further description that just a single existing transaction is encapsulated by a TO.

A TO class is the encapsulation of an existing transaction. When instantiated a TO is able to control and execute its corresponding transaction. At each point in time the TO is aware of the state of the encapsulated transaction.

To execute a certain transaction the TO is required to exchange messages with the transaction. Therefore all TRs, being a model and description of the transaction message, required for the message flow handling of this particular transaction are associated to the TO; i.e. the TO contains all messages which are of importance when communicating with the specific transaction. Of course it is not required to display the messages on a computer screen, much more the messages and their contents are intercepted and made available as objects in form of TRs.

As a transaction may be processed on a remote data processing system a certain amount of definitions, called connection specifications, are incorporated into the TO allowing a TO instance to set up a communication connection to the possibly remote transaction system. The connection specifications encompass data like
the address of the remote computer system
the specific transaction (on the remote system) to be started
authorization related data like userid and password
the concrete communication protocol to be used
etc.

4.1.5 Transaction Steps and Problem-Specific TO Methods (TOMs) (Part 1)

Only in rare circumstances execution of a transaction is the result of a single message exchange of a requesting and an answering message with the transaction being completed afterwards. In most cases a possibly lengthy sequence of message exchanges, i.e. exchange of panel screens, occur from the start to the completion of a transaction. Generally such types of transactions are named conversational transactions for obvious reasons.

Typically a sequence of message exchanges representing a single transaction can be decomposed in a sequence of transaction steps. Each transaction step starts with a message containing information specified by a user, is followed by receiving and sending further messages which could be processed automatically, ending with (but including) a message to be sent to the transaction which again requires information by a user. Thus transaction steps are a decomposition of conversational transaction execution into units of message sequences which can be executed automatically without human intervention. Each of these transaction steps is modelled as an individual instance method of the TO called Transaction Object Method (TOM).

Two types of parameters could be part of a TOM invocation
key attributes uniquely identifying BO instances
If for setting up the message to be sent to the transaction, data is required belonging to BOs, then only the key attributes identifying the BOs are to be specified. As described below generic TO logic is able to retrieve the required BO attribute data for setting up the input message to the transaction.
additional TOM method parameters
This type of parameter is required only if the parameter does not represent an attribute of some BO.

When being called, a TOM triggers to send a message to the (remote) transaction. As the TOM executes a certain transaction step it knows the identity of the messages, i.e. the TRs (refer to the chapter "Architectural Element: Transaction Records (TRs) (Part 1)" for more information) which have to be prepared and sent to the transaction. The TOM issues this processing by calling an architectured instance method inXaction of that TR instance responsible for setting up the particular message.

4.1.6 Architectural Element: Transaction Records (TRs) (Part 2)

Besides the more static and descriptive aspects as depicted in the chapter "Architectural Element: Transaction Records (TRs) (Part 1)" TRs encompass also certain dynamical characteristics realized within architecturized methods.

These activities are performed in concert with the specific TO instance related to the TR instance. In endorsement to the description of the architectural element of a TO (refer to the chapter "Architectural Element: Transaction Objects (TOs) (Part 1)") it has to be stressed that
each TR is instantiated together with its related TO instance with which it sets up a one-to-one correspondence
each TR instance knows its related TO instance
The dynamical characteristics are two-fold and are realized within the following two architectural methods.

4.1.6.1 The Architectured Instance Method inXaction
The TR instance method inXaction is responsible for
creating the correct message template to be transmitted to the transaction
Which message object has to be created results from the nature of the current TO instance, as each TR is responsible for handling a specific message.
copying all required information into the TR; i.e. into the message
As outlined in the discussion on TRs in chapter "Architectural Element: Transaction Objects (TOs) (Part 1)" a TR stores descriptive information for the individual data elements of the TR.
Those TR elements which represent BO attributes can be filled in using the BO key attributes being part of the TOM invocation. The BO key attributes allow the method inxaction to locate the BO instance within the BOIS and to retrieve the required BO attribute values.
Those TR elements not related to BO attributes are expected to be parameters specified as part of the TOM invocation thus permitting the inXaction method to gather this data too.
transmitting the message to the remote transaction
passing the processing of the transaction's output message over to the architectural instance method outXaction of the responsible TR instance for further processing.

The responsible TR instance can be determined by analyzing the received TR.

4.1.6.2 The Architectured Instance Method outXaction outXaction is responsible for analyzing and processing the output message by materializing all BOs affected by the TR contents As outlined in the discussion on TRs in the chapter "Architectural Element: Transaction Objects (TOs) (Part 1)" the TR stores the descriptive information for the individual data elements of the TR. Thus outXaction can determine the TR elements which represent BO attributes locate the affected BOs in the BO Instance Space BOIS or create the BO instance if not existent yet copy the BO attribute data from the TR elements to the BO itself returning the list of materialized BOs to its caller 4.1.6.3 The Architectured Instance Method inXaction (Part 2)

inXaction returns to its caller the list of materialized BOs received upon return from outXaction.

4.1.7 Transaction Steps and Problem-Specific TO Methods (TOMs) (Part 2)

Upon return from the invocation of inXaction the TOM receives the list of materialized BOs.

The TOM has to decide, based upon the output message, i.e. the TR received from the transaction, how to proceed.

If the transaction step has been completed simply the list of materialized BOs is passed to its caller. The TOM triggers to send the next message to the remote transaction by issuing inXaction again with respect to that TR instance responsible for handling the next message and repeating the sequence of activity inXaction-outXaction once more.

4.1.8 Architectural TO Features and Class-Hierarchy

To reduce the amount of implementation effort for each TO class modelling an existing transaction all the generic, i.e. architectural TO features, are realized within the TO super-class BplTransObj. As depending on the type of transaction monitor executing a certain transaction the handling of the message flow between the TO and the remote transaction might be slightly different sub-classes may have been introduced for the individual supported transaction monitors like IMS, CICS, . . . . The sub-class BplIMSTransObj, BplCICSTransObj, . . . might implement the corresponding transaction monitor related deviations. If such deviations do not exist these intermediate classes can be omitted.

The class structure delivers the spectrum of architectural TO features like communication handling transaction invocation and message exchange BO materialization to the problem specific TO classes which are subclasses thereof. The remaining implementation effort within the problem specific TO classes representing the migrated transactions is limited to choosing the concrete communication model and defining the communication specifications modelling the TRs the TO class is responsive to realizing the concrete TOMs implementing the corresponding transaction steps TOM implementation could mean to associate a state to a TO instance which checks the sequence of TOM executions if the remote transaction does not allow TOM execution independent of the TOM predecessor.

4.1.9 Architectural Element: Business Objects (BOs) (Part 2)

As mentioned above, the BOs may exploit the TOs by transparently signalling the TOs to execute the encapsulated transactions.

Those methods of a BO which result in the execution of a (or part of a) transaction are called Business Object Methods (BOMs). The problem specific BOMs are the only interface to exploiters for the overall architecture to transparently execute, without knowledge of the underlying architecture, remote transactions. Two types of parameters could be part of a BOM invocation key attributes, uniquely identifying other BO instances (apart of that BO the BOM belongs to)

additional BOM method parameters

This type of parameter is required only if a parameter does not represent an attribute of some BO.

The BOMs actually will call one or several TOMs for corresponding transaction execution. On return the BOM passes to its caller the list of materialized BOs as received from the executed TOMs. The application programmer is free to combine any TOM sequence within a BOM.

4.2 Defining Transaction Objects (TOs) and Transaction Object Methods (TOMs)

As TOMs are methods of TO classes the definition and generation process of the TOMs is part of the definition and generation process of the TOs. A specific development environment of VisualBridge, called the VisualBridge Graph Editor (VBGE) guides and supports the development process in a graphical manner. The VBGE is based upon VisualAge's Composition Editor.

The definition and generation process may be further supported by VisualBridge parsers. VisualBridge parsers automate the whole process further by being able to read, parse and transform the message definitions of the messages processed by the transaction. This is possible as in the most (transaction) execution environments the panels, i.e. the user interfaces, of an application are defined by some kind of descriptive language. Thus most of the information on the individual panel elements may be extracted from these user interface specifications. In case of the IMS execution environment the panel and message definitions are available as so-called Message Input Descriptor/Message Output Descriptor (MID/MOD) definitions.

The method process to define and generate the TOs with the corresponding TOMs encompass the following individual steps:

1. Definition of a TO as an encapsulation of a transaction
2. Modelling each individual message processed by the encapsulated transaction
3. Definition of the activities for each current message launching the transaction to process a next message, i.e. to perform a message transition
4. Definition of the sequence of messages as processed by the transaction and modelling this sequence as a directed graph, called User Interaction Graph (UIG)
5. Selecting the specific activity required to launch the transaction to process after a current message a next message
6. Classifying the TRs as Entry TR, External TR, Interactive TR or Preemptive TR
7. Generating a message description for each modeled message as TR
8. Connecting a TO to a transaction system 9. Generating the TOMs The sequence of the above steps is not as fixed as it might look at the first sight. First of all, the whole process is a repetitive one, i.e. it may be repeated beginning at each arbitrary step. Second, the classification step of the TR may be performed as soon as the a model of a message has been introduced. Third, the generation of the message description may be not a separate step but a continuous process. Each change of the modeled messages may automatically update the message description, i.e. the TR.

4.2.1 Definition of a TO

The definition of a TO is done within the VisualAge development environment by subclassing from the class BplTransObj. Each TO is a non-visual composite part in the sense of VisualAge. Such a part is created from VisualAge's Application Browser window. This creation automatically starts the VisualAge Composition Editor which is the heart of the Transaction Object development. Within the Composition Editor the TO is visually constructed. Within FIG. 1 the nonvisual TO is symbolized by the background 100.

4.2.2 Modelling the Individual Transaction Messages

To model a certain transaction messages first a skeleton for a TR is created by dragging in FIG. 1 a TR skeleton from the palette 108 to the background 100. Within FIG. 1 the TRs 101 to 103 are examples of this process.

To speed up the process of modelling the message details the message definitions available from within the IMS execution environment may be parsed. This parser is accessible from the settings view of any TR. FIG. 2 shows the "Parser" page of the settings view with the capability to search 201 for a file storing the IMS message definitions and to parse 202 its contents. The parser allows to get all the structural information of an transaction message out of the corresponding screen map definition, i.e. MFS for IMS/DC or BMS for CICS. In cases where the underlying transaction system allows to send back only a subset of the sent data, it is possible to parse both map definitions, e.g. MOD and MID definitions of MFS.

The "Edit" page of the settings view visualized in FIGS. 3 and 4 enables to change the parsed information from the MIDs and MODs or build up that structural information manually. FIGS. 3 and 4 are actually a snapshot of the same window too large to fit on the screen. Further message elements may be added 302 or deleted 303. The parsed or manually created message elements are registered in the list 301. Every individual message element, for instance 304 may be changed. FIG. 4 shows the details of the element 304 which may be edited. As FIG. 4 depicts, each element is characterized by its length 401, its offset 402, alignment 403 and so forth.

4.2.3 Definition of Activities for Each TR

The definition step of the activities for each current TR launching the transaction to process a next TR, i.e. to perform a message transition, is available from the "Action" page of the settings view, refer to FIG. 5. The first combobox named "Actions for Record" 501 contains all actions already defined for this TR. To remove an action select it here and press the "Delete Action" button 502. The combobox 503 contains all possible actions. To add an action a Program Function (PF) key is to be selected here and to be added by 504 to the list 501.

4.2.4 Definition of the Message Sequence Processed by the Transaction

To model for a TO the sequence in which the encapsulated transaction processes the messages edges (arcs) are to be drawn between the TRs associated to that TO exactly in the way they follow each other in the interaction flow. Those edges are implemented as Event-to-Action connections in the sense of VisualAge. There connections between 2 TRs are drawn by:
1. moving the mouse pointer to the first TR being the source of the connection and select connect from its pop-up menu.
2. from the appearing menu selecting the event nextRecord.
3. moving the mouse over the second TR being the target of the connection and select outXaction from its pop-up menu.

After this definition process a connection line is drawn between the two TRs signifying the message processing sequence of the transaction and making the target TR sensitive to a nextRecord event.

The definition process introduces the following behavior to the TRs:
1. Whenever the method inXaction for the source TR is invoked explicitly or implicitly what happens is that the source TR sends its data to the encapsulated transaction and waits for an response.
2. When the response arrives the source TR asks its TR successors, which one is responsible for its processing by sending the event nextRecord.
3. This event triggers the action outXaction of the correct successors TRs, i.e. the target TRs. The correct target TR responsible for the response will start processing the TR's contents.
4. After that the target TR implicitly invokes inXaction on itself, resulting in proceeding with the next processing entity.

The result of this modelling step is the UIG for currently modelled TO. FIG. 1 gives an example of an UIG. Within FIG. 1 the edges 110 to 112 describe and visualize the sequence of message processing.

4.2.5 Selecting the Specific Activity for Message Transition

Within this step it has to be defined for a the current message model, i.e. for a TR, by which kind of specific activity taking place with respect to the current TR the encapsulated transaction is launched to sent the specific successor message, i.e. a successing TR. FIG. 6 visualizes the "Transition" page of the settings view of a TR for which the activity for a message, i.e. TR transition is to be defined. Actually FIG. 6 is snapshot of one window too large to fit on the screen. All possible TR successors are listed in the combobox 601. Its contents is in accordance to the UIG defined in the previous steps, i.e. its contents consists of all TR connect with the current by an edge of the UIG.

For every individual successor TR the set of parameters and its values (if special constants are passed) together with an action (a PF key for instance) by which this node can be reached has to be modelled. The default behavior is that every successor needs all parameters without special values together with the ENTER key as default action.

For the selected TR successor 601 the parameters listed in the "Parameter" combobox 602 (representing message or panel elements of the successing message) can be added or changed by pressing "Add to Succ" 607. If the "Constant" text field 603 is filled with a certain value the added parameter will be associated with this constant. This defines that the selected successor will be reached by passing the specified constant for that parameter in the message represented by the current TR to the transaction for processing. If no constant value is added any value must be possible to reach the specified successor TR. All parameter associations added to launch the encapsulated transaction to send the successor message once the current message is processed are listed in the combobox 602 labeled "Parameters for the Selected Successor".

An action can be specified in addition which, together with the above parameter values, triggers the encapsulated transaction to launch the successor TR. This action is selected from the combobox 604 named "Action". If a successor TR may be reached with more than one action (for example PF1 and ENTER) one of them must be chosen. This action will then be used by the generation process for the TOMs.

The so-called Transition Groups can be listed by pressing "View" 606. A Transition Group contains all successor TRs reachable by the same parameter constellation from the current TR. Each Transition Group will result in a separate TOM (refer also to the description below).

4.2.6 Classifying the TRs

TRs may be of different types, i.e. they may incorporate various indications designating their specific nature. Though the current description illuminates the step of classifying the TRs at a precise location within the overall methodology it has to be pointed out that classification of the TRs may take place at any point in time after defining a TR within the VBGE.

Currently the following TR types can be distinguished:

Entry TR

An Entry TR is an encapsulation and model of a message to be exchanged with the transaction execution environment (IMS in our case) by which a certain transaction is started. Consequently an Entry TR encompasses at least the IMS transaction code of the transaction to be started. In addition all further input message elements have to be modelled within an Entry TR required by the transaction to send its first output message as a result. Therefore apart from the transaction code being part of an Entry TR there is no difference to an Interactive TR as outlined below.

A model of an Entry TR is visualized in FIG. 7 showing the "Edit" page of the settings view of an Entry TR. 701 indicates the important and specific data element in that Entry TR, the transaction code required to start the transaction. Of course an additional number of parameters, like 702, may be modelled.

External TR

An External TR is an encapsulation and model of a message handled by another TO, i.e. an External TR is part of the UIG of another TO outside the scope of that TO currently modelled with VBGE. It thus provides the mechanism to model existing transactions calling each other, whereby the transactions are encapsulated and handled by different TOs. The concept of External TRs supports the reuse of transaction encapsulated and modelled by other TOs already.

That at TR is an External TR may be specified on a page of the settings view of the TR within the VBGE together with the specific TO the External TR refers to. An External TR is symbolized with a specific identifying icon within the UIG.

Interactive TR or Preemptive TR

Interactive or Preemptive distinguish whether input values for a message encapsulated by a TR can be provided in advance. If input for a TR can be provided in advance a TR is called and indicated Preemptive, which is also reflected by the color of the TR icon within the UIG. In other words a Preemptive TR is part of an execution unit of succeeding messages within a UIG and thus indicates a message to be processed automatically by a TOM to be generated later. If input could not be provided in advance for a TR it is called Interactive, which is also reflected by the color of the TR icon within the UIG. In other words an Interactive TR indicates a TR being the first message of an execution unit of messages and thus starts the message exchange of a certain TOM to be generated later. In general when creating a TR within the VBGE it is first assumed that the TR is an Interactive TR. It is the up to the user to modify this classification. Within the "Type" page of a TR's setting view a button allows to toggle between a Preemptive or Interactive indication of a TR.

4.2.7 Generating the Modelled TRs

The modelled TRs may be either generated continuously after each modification occurring during the editing session within the VBGE. An other alternative is to generate the TRs on user request by allowing a user within the VBGE to explicitly start the generation process. A next alternative is to start the TR generation process when the VBGE is closed.

4.2.8 Connecting a TO to a Transaction System

To identify the specific transaction environment capable of executing the specific transaction encapsulated by a certain TO that TO has to be "connected" to the transaction environment. With the same definition process the specific transaction environment as well as the specific network protocol to communicate with the transaction execution environment is designated. This offers complete freedom and transparency whether the TO and the encapsulated transaction are executed on the same or on remote data processing systems.

This process of "connecting a TO to a transaction system" is performed by dragging a "connection specification part" skeleton, symbolized by an icon within the parts palette 108, to the background 100. Now having the connection part available an attribute-to-attribute connection between the connection part's self attribute and the ConnectionSpec attribute of the TO completes the first part of the definition process. Currently the following connections to transaction systems are supported:

IMS implicit APPC

CICS

Emulation of the 3270 data stream

The second part of the definition process is achieved my entering information within the settings view of the connection specification part. Via this notebook all aspects to establish communication with the transaction system must be defined. For instance address of the potentially remote data processing system, userid, password, and so forth. 104, 105 and 106 is the result of this definition process.

4.2.9 Generating the TOMs

Actually a TOM starts or continues a transaction and works through a certain subgraph within the UIG. Before generating the TOMs making up the complete UIG all modelling and definition steps above have to be completed carefully. Especially the categorization of TRs into Interactive or Preemptive TRs has to be completed as this categorization defines where within the UIG a new TOM begins and where it ends.

Messages encapsulated as TRs and exchanged with the encapsulated transaction which contain data elements which typically cannot be provided in advance typically will be classified as Interactive TRs. Those TR encapsulating for instance output information only and/or requesting input information which can be provided in advance typically will be classified as preemptive TRs.

With respect to the TOM generation process and from the TOM point of view a TR of the Interactive type is the end point of a first TOM and the starting point of the next TOM. All data elements of a Preemptive TR which are of input character will be reflected as input parameters of the TOM to be generated. The same statement holds for the Interactive TRs too. Input fields of a TR which are set to a fixed value or are related to a BO attribute are not reflected in a TOM interface as parameter. Output fields in a TR will be made available with their current values from a result object which will be returned by the TOM. As a remark, when talking here about TR input/output fields only those are of interest, which have no association with a BOA. Data fields of a TR having an association with a BOA are mapped automatically and are not passed via the TOM interface; i.e. these input fields are retrieved from the associated BO instances directly and written to the message encapsulated by the TR while these output fields are written to the associated BOA thus making up a part of the partial materialization process mentioned above. Without a materialization process of course also the BOAs would have to be interface parameters of a generated TOM.

For the TOM concept also the notion of a Transition Group is of importance. When a certain message encapsulated by a TR is sent to the transaction for processing it is not known in advance in all cases which message will be returned by the transaction as response (this may depend on the data the transaction is operating on). Therefore all successor TRs in the sense of the UIG potentially reachable from a current TR with the same parameter values as defined in the steps above represent a Transition Group and will be incorporated to in the same TOM. On the other hand different Transition Groups are established if different parameter values are required to launch the transaction to sent the corresponding messages. Different parameter values might mean that different constants for one or more input values or a different combination of input fields are defined for triggering TR transitions.

As a first activity to generate the TOMs the settings view of the definition environment of the TO (refer to FIG. 1) offers an action "create TOMBuilder". Whenever this activity is started first all available TOMs, potentially generated in a previous "create TOMBuilder" step are removed. Then the whole UIG is traversed and analyzed including all definitions and specifications delineated within the VBGE. For every TOM which could theoretically be built from this graph a so-called "TOMBuilder" object is created. A TOMBuilder object is not the TOM itself but it stores all required information allowing the TOMBuilder object when executed to generate the TOM it is representing. A separate TOM will be generated for each subgraph in the UIG of the modelled TO starting with an Entry TR or an Interactive TR including all succeeding Preemptive TRs up to the next Interactive TR or to the final Preemptive TR in the UIG or up to an External TR.

As depicted in FIG. 8 within the settings view of the TO modelled in the VBGE the UIG, decomposed into a TOM graph 801 (represented in a Smalltalk notation), is visualized. In the list 802 each of generated TOMBuilder may be executed 803 to actually generate its corresponding TOM.

To further improve the understanding of the TOM generation process a set of UIG scenarios should be discussed explaining the TOM decomposition process.

FIG. 9 shows a UIG consisting of a linear chain of one Interactive TR 901 and 3 Preemptive TRs 902 to 904. According above mentioned TOM generation rules only one TOM 905 will be generated consisting of the execution 901 to 904 of TRs.

FIG. 10 shows a more complex UIG consisting of a single Interactive TR 1001 and Preemptive TRs 1002 to 1006. Assuming that the execution unit of TR 1001, 1002, 1003 requires a different parameter constellation than the rest of the UIG then according above mentioned TOM generation rules 2 different TOMs will be generated. A first TOM 1008 consisting in the UIG sub-graph of TRs 1001, 1002, 1004, 1005, 1006 and a second TOM consisting in the sub-graph of TRs 1001 to 1003.

FIG. 11 depicts an even more intricate UIG made up of Interactive TRs 1101 and 1103, made up of Preemptive TRs 1102, 1105, 1106 and made up of External TRs 1104, 1107. The UIG decomposition process will thus generate 3 TOMs.

A first TOM 1110 starting with the Interactive TR 1101 ending with the External TR 1107 and thus consisting of the execution of TRs 1101, 1102, 1105, 1106 and 1107.

A second TOM 1108 starting with the Interactive TR 1101, also containing Preemptive TR 1102 and ending with the next Interactive TR 1103.

A third TOM 1109 starting with the Interactive TR 1103 and ending with the External TR 1104.

| 5 Acronyms | |
|---|---|
| BA | Business Application |
| BOA | Business Object Attribute |
| BOGA | Business Object General Attributes |
| BOIS | Business Object Instance Space |
| BOKA | Business Object Key Attribute |
| BOM | Business Object Method |
| CICS | Customer Information Control System |
| IMS | Information Management System |
| MFS | Message Format Service |
| MID | Message Input Descriptor |
| MOD | Message Output Descriptor |
| OLTP | Online Transaction Processing |
| OO | Object Orientation |
| OOT | Object Oriented Technology |
| TO | Transaction Object |
| TOM | Transaction Object Method |
| TM | Transaction Method |
| TR | Transaction Record |
| TST | Transaction Step |
| UIG | User Interaction Graph |
| VBGE | VisualBridge Graph Editor |

What is claimed is:

1. A method for migrating Business Applications executed on a data processing system to a modern environment wherein said Business Applications hitherto offer their services interactively controlled by a multitude of Business Application panels and wherein said Business Applications may enter succeeding Business Application panels dependent on user interactions, user specified data and the contents of a database operated on by the Business Applications, said method comprising:

arranging one or more of the Business Applications into one or more Transaction Objects;

arranging one or more of said Transaction Objects into one or more Transaction Object Methods enabled to transparently and autonomously execute the underlying Business Applications by handling a sequence of Business Application panels;

transparently signaling Transaction Objects in at least one of said Transaction Object Methods to execute Business Applications to create Business Objects, said Business Objects being maintained in Business Object Instance Space in the database;

communicating between Transaction Objects in said Transaction Object Methods with messages arranged in defined Transaction Records, each Transaction Record being instantiated with a related one Transaction Object to supply or retrieve data as part of the related one Transaction Object invocation;

retrieving Business Objects from said Business Object Instance Space automatically and placing said retrieved Business Object in a Transaction Record when said retrieved Business Object is needed later in the Transaction Object Method such that Business Objects may be reused;

placing said Transaction Object Methods into a graph, said graph including predecessors of Business Applications, Transactions Objects and Business Objects making up said Transaction Object Methods; and determining from said graph, legacy Business Applications which provide data and Business Objects needed for performing said Transaction Object Methods in the modern environment.

2. The method according to claim 1 further comprising:

Arranging said Business Applications and said Transactions Objects from a first number of Business Applications to form a new application system comprising at least one Transaction Object Method having a second number of Business Applications, said second number being less than said first number, and interaction of Transaction Record messages between said Transaction Objects.

3. The method according to claim 2 wherein said Transaction Object Method formed of said new application system is uniquely identified by user chosen identifier.

4. The method according to claim 1 wherein said Transaction Record comprises an external Transaction Record which calls another Transaction Object.

5. The method according to claim 1 wherein said Transaction Record comprises an internal Transaction Record which starts the Transaction Object.

6. The method according to claim 1 wherein said Transaction Record comprises a preemptive Transaction Record which contains data which is provided in advance for use by a Transaction Object Method.

7. The method according to claim 1 wherein said Transaction Record comprises an interactive which contains data which is not provided in advance, but whose data is the result of earlier run Transaction Objects run by said Transaction Object Method.

8. The method according to claim 1 wherein said Transaction Record includes parameters and keystrokes.

9. The method according to claim 8 wherein said keystrokes include keystrokes generated by PF keys.

10. The method according to claim 1 further comprising detecting all Transaction Records needed for said Transaction Object Method and automatically associating said Transaction Object Method with said detected needed Transaction Records.

11. An apparatus for migrating Business Applications executed on a data processing system to a modern environment wherein said Business Applications hitherto offer their services interactively controlled by a multitude of Business Application panels and wherein said Business Applications may enter succeeding Business Application panels dependent on user interactions, user specified data and the contents of a database operated on by the Business Applications, said apparatus comprising:

one or more of the Business Applications arranged into one or more Transaction Objects;

one or more of said Transaction Objects arranged into one or more Transaction Object Methods enabled to transparently and autonomously execute the underlying Business Applications by handling a sequence of Business Application panels;

said data processing system transparently signaling Transaction Objects in at least one of said Transaction Object Methods to execute Business Applications to create Business Objects, said Business Objects being maintained in Business Object Instance Space in the database;

said data processing system further communicating between Transaction Objects in said Transaction Object Methods with messages arranged in defined Transaction Records, each Transaction Record being instantiated with a related one Transaction Object to supply or retrieve data as part of the related one Transaction Object invocation;

said data processing system further retrieving Business Objects from said Business Object Instance Space automatically and placing said retrieved Business Object in a Transaction Record when said retrieved Business Object is needed later in the Transaction Object Method such that Business Objects may be reused;

said data processing system further placing said Transaction Object Methods into a graph, said graph including predecessors of Business Applications, Transactions Objects and Business Objects making up said Transaction Object Methods; and said data processing system further determining from said graph, legacy Business Applications which provide data and Business Objects needed for performing said Transaction Object Methods in the modern environment.

12. The apparatus according to claim 11 further wherein said data processing system further arranges said Business Applications and said Transactions Objects from a first number of Business Applications;

a new application system comprising at least one Transaction Object Method having a second number of Business Applications, said second number being less than said first number; and Transaction Record messages providing interaction between said Transaction Objects.

13. The apparatus according to claim 12 wherein said Transaction Object Method formed of said new application system is uniquely identified by a user chosen identifier.

14. The apparatus according to claim 11 wherein said Transaction Record comprises an external Transaction Record which calls another Transaction Object.

15. The apparatus according to claim 11 wherein said Transaction Record comprises an internal Transaction Record which starts the Transaction Object.

16. The apparatus according to claim 11 wherein said Transaction Record comprises a preemptive Transaction Record which contains data which is provided in advance for use by a Transaction Object Method.

17. The apparatus according to claim 11 wherein said Transaction Record comprises an interactive which contains data which is not provided in advance, but whose data is the result of earlier run Transaction Objects run by said Transaction Object Method.

18. The apparatus according to claim 11 wherein said Transaction Record includes parameters and keystrokes.

19. The apparatus according to claim 18 wherein said keystrokes include keystrokes generated by PF keys.

20. The apparatus according to claim 11 wherein said data processing system detects all Transaction Records needed for said Transaction Object Method and automatically associating said Transaction Object Method with said detected needed Transaction Records.

21. A program product for migrating Business Applications executed on a data processing system to a modern environment wherein said Business Applications hitherto offer their services interactively controlled by a multitude of Business Application panels and wherein said Business Applications may enter succeeding Business Application panels dependent on user interactions, user specified data and the contents of a database operated on by the Business Applications, said program product comprising:

a computer readable medium having recorded thereon computer readable program code performing the method comprising:

arranging one or more of the Business Applications into one or more Transaction Objects;

arranging one or more of said Transaction Objects into one or more Transaction Object Methods enabled to transparently and autonomously execute the underlying Business Applications by handling a sequence of Business Application panels;

transparently signaling Transaction Objects in at least one of said Transaction Object Methods to execute Business Applications to create Business Objects, said Business Objects being maintained in Business Object Instance Space in the database;

communicating between Transaction Objects in said Transaction Object Methods with messages arranged in defined Transaction Records, each Transaction Record being instantiated with a related one Transaction Object to supply or retrieve data as part of the related one Transaction Object invocation;

retrieving Business Objects from said Business Object Instance Space automatically and placing said retrieved Business Object in a Transaction Record when said retrieved Business Object is needed later in the Transaction Object Method such that Business Objects may be reused;

placing said Transaction Object Methods into a graph, said graph including predecessors of Business Applications, Transactions Objects and Business Objects making up said Transaction Object Methods; and determining from said graph, legacy Business Applications which provide data and Business Objects needed for performing said Transaction Object Methods in the modern environment.

22. The program product according to claim 21 wherein said method further comprises:

arranging said Business Applications and said Transactions Objects from a first number of Business Applications to form a new application system comprising at least one Transaction Object Method having a second number of Business Applications, said second number being less than said first number, and interaction of Transaction Record messages between said Transaction Objects.

23. The program product according to claim 22 wherein said Transaction Object Method formed of said new application system is uniquely identified by user chosen identifier.

24. The program product according to claim 21 wherein said Transaction Record comprises an external Transaction Record which calls another Transaction Object.

25. The program product according to claim 21 wherein said Transaction Record comprises an internal Transaction Record which starts the Transaction Object.

26. The program product according to claim 21 wherein said Transaction Record comprises a preemptive Transaction Record which contains data which is provided in advance for use by a Transaction Object Method.

27. The program product according to claim 21 wherein said Transaction Record comprises an interactive which contains data which is not provided in advance, but whose data is the result of earlier run Transaction Objects run by said Transaction Object Method.

28. The program product according to claim 21 wherein said Transaction Record includes parameters and keystrokes.

29. The program product according to claim 28 wherein said keystrokes include keystrokes generated by PF keys.

30. The program product according to claim 21 wherein said method further comprises detecting all Transaction Records needed for said Transaction Object Method and automatically associating said Transaction Object Method with said detected needed Transaction Records.

* * * * *